(12) United States Patent
Davidson et al.

(10) Patent No.: US 7,616,326 B2
(45) Date of Patent: Nov. 10, 2009

(54) PROXIMITY-LEVERAGING, TRANSVERSE DISPLACEMENT SENSOR APPARATUS AND METHOD

(75) Inventors: Morgan Davidson, River Heights, UT (US); Steven R. Wassom, Smithfield, UT (US)

(73) Assignee: Utah State University Research Foundation, North Logan, UT (US)

( * ) Notice: Subject to any disclaimer, the term of this patent is extended or adjusted under 35 U.S.C. 154(b) by 104 days.

(21) Appl. No.: 11/770,666

(22) Filed: Jun. 28, 2007

(65) Prior Publication Data

US 2008/0043251 A1   Feb. 21, 2008

Related U.S. Application Data

(60) Provisional application No. 60/818,075, filed on Jun. 30, 2006.

(51) Int. Cl.
*G01B 11/14* (2006.01)
*G01B 11/26* (2006.01)
*G01C 1/00* (2006.01)

(52) U.S. Cl. ..................... 356/614; 356/138
(58) Field of Classification Search ... 356/237.1–241.6, 356/426–431, 600–640
See application file for complete search history.

(56) References Cited

U.S. PATENT DOCUMENTS

| | | | | |
|---|---|---|---|---|
| 3,914,596 A * | 10/1975 | Finkel et al. | ............. | 250/203.2 |
| 4,101,206 A | 7/1978 | Oskam et al. | | |
| 4,815,213 A * | 3/1989 | McCabe et al. | ............... | 33/702 |
| 5,027,133 A | 6/1991 | Weiselfish | | |
| 5,220,536 A * | 6/1993 | Stringer et al. | ................. | 367/99 |
| 5,245,869 A | 9/1993 | Clarke | | |
| 5,619,414 A * | 4/1997 | Ishii | ............................ | 700/175 |
| 5,699,161 A * | 12/1997 | Woodworth | ................. | 356/628 |
| 6,124,709 A * | 9/2000 | Allwine | .................... | 324/207.2 |
| 6,253,460 B1* | 7/2001 | Schmitz | ....................... | 33/706 |
| 6,682,863 B2* | 1/2004 | Rivers et al. | .................. | 430/22 |
| 7,039,501 B2* | 5/2006 | Freeman et al. | ............. | 700/258 |
| 7,063,256 B2* | 6/2006 | Anderson et al. | ........... | 235/385 |

OTHER PUBLICATIONS

Kaman Noncontact Position Sensors, Measuring Systems Group, Application Handbook, 1999, pp. 1-80, Kaman Instrumentation Corporation, Colorado Springs, Colorado.
D. Scott Schwinger and Claef F. Hakun, Low-Power Shutter Mechanism for a Cryogenic Infrared Camera, Technical Support Package, pp. 1-23, NASA Tech Briefs GSC-14341, Goddard Space Flight Center, Greenbelt, Maryland.
The Application of Inductive Proximity Switches with Analog Output, 2001, pp. 1-4, Contrinex AG, Switzerland.

* cited by examiner

*Primary Examiner*—L. G. Lauchman
*Assistant Examiner*—Jarreas C Underwood

(57) ABSTRACT

A system for determining the longitudinal position of a displaceable element positioned between two substantially orthogonally laterally opposing displacement sensors measures a distance from each displacement sensor to the displaceable element. The displaceable element has a tapered thickness along its length. A change in the longitudinal position of the displaceable element causes the proximity sensors to each detect their distance to the displaceable element, which distances then correspond directly to the local thickness and thus the longitudinal position of the displaceable element. The system calculates the position of the displaceable element. The system can easily factor out errors in measured lateral proximity position of the displaceable element, since an erroneous proximity to one sensor is equal and opposite to an erroneous proximity to the other.

18 Claims, 6 Drawing Sheets

FSM Performance

| Specification | Value |
|---|---|
| Aperture (mm) | 75 |
| Mirror RMS WFE (waves HeNe) | 1/12 |
| Mirror Surface RMS Roughness (angstroms) | 20 |
| Mass (kg) | 1.0 |
| Avg. Power (W) | 0.4 |
| Peak Power (W) | 30 |
| Azimuth Rot. (mechanical deg) | ±60 |
| Elevation Rot. (mechanical deg) | ±15 |
| Azimuth Error Mean (arcsec) | <1 |
| Azimuth Error Mean (arcsec) | <3 |
| Elevation Error Mean (arcsec) | <0.05 |
| Elevation Error Std. Dev. (arcsec) | <6.5 |
| Azimuth Slew rate (0-100%) (deg/sec) | 160 |
| Elevation Slew Rate (0-100%) (deg/sec) | 75 |
| Bandwith (Hz, 100 arcsec amplitude | 70 |
| Gain Margin (dB) | 6 |

FIG. 9

PROXIMITY-LEVERAGING, TRANSVERSE DISPLACEMENT SENSOR APPARATUS AND METHOD

RELATED APPLICATIONS

This patent application claims the benefit of U.S. Provisional Patent Application Ser. No. 60/818,075, filed on Jun. 30, 2006 and entitled Displacement Sensor Apparatus.

BACKGROUND

1. The Field of the Invention

The invention relates generally to the field of displacement sensors and, more specifically, the use of proximity sensors to determine the position of a displaceable element moving transversely with respect thereto.

2. The Background Art

In measurement systems, precision often stands opposed to large displacements. Measurement of large displacements or large angles, such as for motion control, typically must sacrifice precision as the range of displacement increases.

In satellite systems, because features such as space, weight, accuracy, isolation, non-contact, power, and the like are at a premium, the ability to measure comparatively large distances is limited. Conventional systems, such as linear transducers and other mechanisms to measure distance, are exceedingly bulky, heavy, and slow, and cause frictional losses and the like.

Displacement measurements are made by a plethora of mechanisms. In certain applications, particularly those in small satellites, space, weight, precision, and power are all at a premium. Oftentimes, isolation is required, and various sources of frictional loss must be minimized. Therefore, one need is for a very precise, non-contact, measurement system, over comparatively large distances. In fact, a disproportionately great incremental sensitivity of the measurement system is needed to detect small changes in displacement over comparatively large ranges of displacement.

Often, measurement is done with optical encoders to improve precision. For example, such systems in rotation require bearings and well-defined centers of rotation. The bearing sets must be extremely precise, and they add substantial energy loss due to friction. What is needed is a system that can provide both measurement of a large displacement, and comparatively fine precision, particularly for controlling motion without those resource commitments and costs.

For example, in small satellite designs, flexible pivot systems save space and energy, but cannot use optical encoders. The wear, galling, friction, and energy loss due to various mounts and bearing systems in optical encoder systems consume too many weight, energy, and data processing resources for small satellite applications.

Error arises in mechanical systems from distortion, displacement, misalignment, vibration, and other mechanical sources of error in manufacture, installation, operation, and environmental control. Moreover, mechanical devices have very practical, inherent limitations on their accuracy and precision in fabrication, assembly, and operation. What is needed is a system that is tolerant of such mechanical errors as common as misalignment, wobble, and vibration of mechanical elements. As in all mechanical systems, vibration and other oscillatory motions need to be accommodated somehow, but doing so can consume excessive and unavailable power and data processing resources, in addition to cost and complexity.

With respect to absolute distance between a surface and a proximity sensor, these errors must somehow be engineered out. However, what is needed is a mechanism to automatically compensate for such errors, in order to provide real time data that can be compensated to remove errors, and thus remove the need to process data before using it. For example, in a high speed response, a physical element may need control signals to operate at a very high frequency or band width. If data must be first processed by a computer before being used, that processing time delays the response time. For control systems, it would be advantageous if an electrical connection scheme could be devised in order to cancel errors directly as they are made.

Proximity sensors have substantial precision in detecting their relative distance to a target object. In fact, proximity sensors have sufficient precision, that they can detect comparatively very fine changes in their distance to, for example, a metal object. Their range of motion is necessarily limited to comparatively small overall displacement ranges, however, because the phenomena on which they rely decay rapidly with distance. Thus, the very sensitivity they provide renders them ineffectual at distances greater than the order of magnitude of the operational faces of such sensors.

Thus, what is needed is an apparatus and method to provide for comparatively large displacements, disproportionately precise measurement of those displacements, and immediate correction of errors due to vibration and other mechanical sources of measurement errors.

BRIEF SUMMARY OF THE INVENTION

In view of the foregoing, in accordance with the invention as embodied and broadly described herein, a method and apparatus are disclosed in one embodiment of the present invention as including a leveraging of the sensitivity of a proximity sensor. Such leveraging or expansion of the range of detection is possible by moving a linearly tapered (e.g. sloped) surface past the sensors at substantially right angles, with respect to the sensors' "line of sight." The direction of the displacement or movement of interest is transverse to a line between the centers of the operational faces of a pair of detectors, and vice versa.

Thus, for example, as the displaced object (displaceable element) moves along its longitudinal direction (longitudinally with respect to itself, or circumferentially in a pivoting system), the sloping side surfaces thereof approach or recede from the sensors located on opposite sides thereof. Thus a large displacement only results in a small, but precisely detectable distance of proximity to the side surface of the displaced object. This means a comparatively large displacement may be detected with substantial accuracy, with a minimal weight, and a non-contact mechanism.

Thus, the ability to precisely detect the distance between a proximity sensor and an object may be leveraged to provide additional expansion of that precision. Scaling of proximity is possible, according to a slope of a tapered surface of an object moving transversely with respect to a proximity sensor substantially directed toward a surface of a material. The detectors may be arranged "normal" (perpendicular) to the surfaces detected, or to the longitudinal direction of motion.

The sensor, by either means may detect the distance to that material. Accordingly, if the material is moved at right angles, or substantially at right angles with respect to the sensor (instead of toward and away from it directly), then that material's surfaces gradually move closer and farther by virtue of being angled or tapered. Thus, as the surface moves at substantially a right angle with respect to the line to the sensor, then proximity of the tapered or sloped surface of the material to the sensor can be linearly or nonlinearly corresponded to the location of the material that is being detected.

The use of two proximity sensors or other sensors capable of measuring distance to a surface, positioned opposite one another (on opposite sides of a displaceable element) provides improved accuracy. One beneficial feature due to the use of at least two sensors, positioned on opposite sides of the displaced object is rapid error correction. As the normal mechanical sources of error result in the displaced object being misaligned or otherwise moving too close to one sensor, the exactly equal and opposite effect occurs with respect to the opposing sensor. Thus, the signals contain their own self compensating data.

The outputs may be processed, bridged, or the like to rapidly and timely remove the errors to support sufficiently high bandwidth control without consumption of resources otherwise required. That is, since vibration, in the direction of proximity or distance with respect to a sensor, will be exactly equal and opposite for each of two sensors positioned opposite one another, then these sensors' signals may be immediately and directly processed as electrical or data signals in order to cancel the effect of many such mechanical errors. Spurious measurements of distances added by one sensor, will appear as distances subtracted from the other. In some embodiments, these may be electrically cancelled, and not even require processing.

Misalignment (e.g. linear translation toward one sensor) may likewise be automatically compensated. Thus, to the extent that one sensor is consistently at a greater, improper distance from a surface, the opposing side will be exactly the same improper distance closer to its corresponding sensor.

In yet another situation, a sensor having a moveable element that has expanded or contracted with temperature, may have errors. These are determinable from the coefficients of thermal expansion of materials or experimentation. A temperature probe can detect proper temperatures. A straightforward linear relationship may compensate by providing an offset in calibration.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 9 is a table providing the parameters and their values established during testing of the apparatus of FIG. 8.

DETAILED DESCRIPTION OF THE PREFERRED EMBODIMENTS

Figure 1:
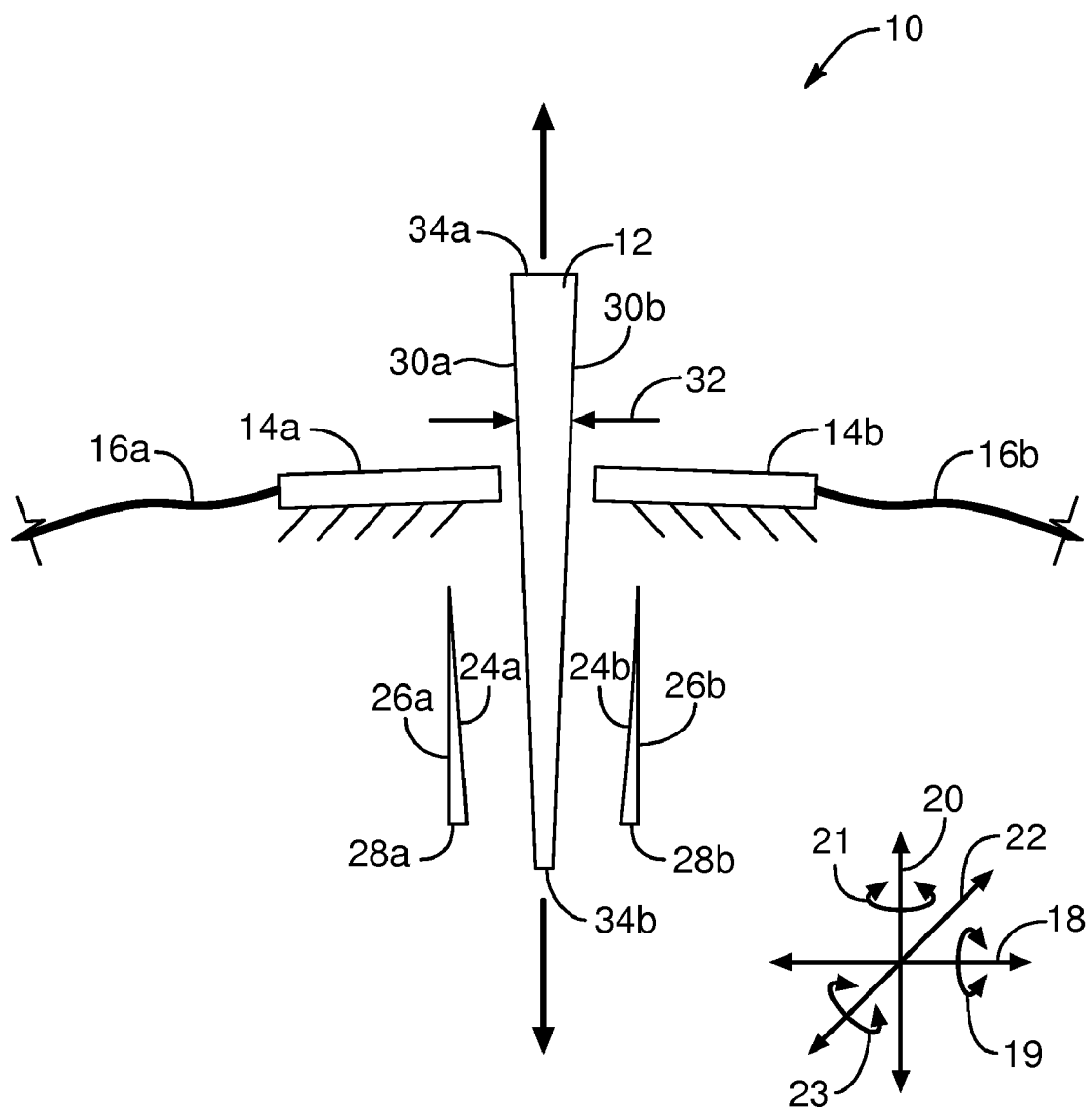
FIG. 1 is a schematic diagram of an apparatus having a moveable element moving transversely with respect to a pair of proximity sensors.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

In one embodiment, two displacement sensors may be arranged on opposite sides of, and each at a known distance from, a moveable, displaceable element. The displaceable element is positioned between the two displacement sensors to move transversely with respect thereto. The displaceable element is moveable within some suitable range defined by the dimensions of the displaceable element. The first displacement sensor (e.g. proximity sensor or the like) measures a distance from the first displacement sensor to a sloped or tapered surface of the displaceable element. Similarly, the second displacement sensor measures a distance from the opposite, and typically equally tapered, surface of the displaceable element. A change in the position due to transverse displacement of the displaceable element causes these proximities or shortest distances between sensors and the moveable object to vary according to the taper and the position of the displaceable element. The system calculates the position of the displaceable element using the distances. The sensors may be electrically bridged together to automatically compensate for errors in the absolute position (e.g. proximity) of the displaceable element with respect thereto.

The type of sensor used in an embodiment depends on the particular application. Examples of suitable sensors include, but are not limited to non-contact proximity transducers (inductive or capacitive), strain gages, optical encoders, resolvers, inductosyns, and contact followers. However, a major value of this technology is in non-contact embodiments.

In one embodiment, a displaceable element is in the shape of a wedge. Two displacement sensors are positioned opposite one another to permit the displaceable element to move therebetween at a substantially right angle with respect to the line of shortest distances to the sensors. Each displacement sensor detects the distance from itself to the displaceable element. The position, X, of the displaceable element along an X-axis or direction of displacement may be calculated as $X=K(S-(D_{11}+D_{12}))+X_0$, where K is the proportionality constant describing the taper of the wedge-shaped displaceable element, S is the nominal separation between the displacement sensors, $X_0$ is an offset or initial position, and $D_{11}$ and $D_{12}$ are the respective distances from the first and second sensors to the respective surfaces of the displaceable element.

A displaceable element may be shaped to move linearly or to undergo angular displacement. The two displacement sensors make two respective measurements and the system calculates the angular position of the displaceable element, automatically cancelling errors due to vibration or the like.

Use of displacement sensors arranged in one or more opposing pairs may be more desirable in some applications because this arrangement of automatically adding the equal and opposite errors of the two sensors lowers the sensitivity of the system to relative displacements out of the plane of symmetry of the displaceable element (e.g. wobble, vibration, misalignment, etc. away from or toward a sensor). Therefore, this pair of sensors improves the precision of the system. That is, since movement toward one sensor is away from the other, the data can be processed, or the sensors can be connected in a bridge to directly and automatically correct such errors.

One example of an application which may benefit from such improved precision is the control of an axis of movement of a fine steering mirror for use on a small satellite. A fine steering mirror was attached pivotally to a base. A displaceable element was connected to move with the fine steering mirror on a swing arm. The material from which the displaceable element is fabricated is dependent on the particular application. In this embodiment the displaceable element was made of aluminum.

Two displacement sensors were positioned opposite one another with the displaceable element moving transversely with respect to a line between them. The displacement sensors measured their respective distances to the displaceable element. As the mirror pivoted about the pivot axis, the sloped or tapered surfaces closest to each sensor caused the proximity distances to vary. As the mirror rotated about the pivot axis, the thickness of that portion of the displaceable element positioned between the displacement sensors varied linearly. Therefore, the proximity distances varied linearly according to the position of the mirror. The sensor outputs were processed to compensate for proximity errors as explained above. The position information generated using those distances was used in a feedback configuration to control a motor positioning the mirror.

Extreme temperatures experienced by a small satellite may cause changes in the physical characteristics of the displaceable element. A system may compensate for changes to the physical characteristics of the displaceable element by using a temperature probe (not shown) and appropriate calibration techniques. A system may compensate for nonlinearity in the displaceable element by using appropriate calibration techniques. Such multi-variable calibration may increase the precision of the positioning system.

Referring to FIG. 1, in particular, and generally to FIGS. 1-6, an apparatus 10 or system 10 may include a moveable element 12 or moveable member 12. In certain embodiments, the object 12 or element 12 may be formed as a wedge-shaped element 12. That is, surfaces may be sloped on opposing sides of the element 12.

Sensors 14, embodied as sensors 14a, 14b may be of various types. (Trailing letters after reference numbers herein simply indicate specific instances of the item generically designated by the leading reference number.) In one presently contemplated embodiment, the sensors may be non-contact sensors, such as capacitive, inductive, optical, or other sensors capable of detecting the presence and distance of a surface of a particular material. In certain embodiments, the sensors 14 may actually be contact sensors. However, in other embodiments, where non-contact sensing is required, the sensors may be non-contact, proximity sensors 14.

Each sensor 14 may have a corresponding line 16, such as an electrical wire, a cable, a photo-optic line, or the like to transmit signals received or otherwise transduced by the sensors 14. Typically, the lines 16 carry the signals, such as an optical signal, or a voltage to a computer for processing. In one embodiment, the sensors 14 may actually be optical detectors and each of the lines 16a may actually be an optical line carrying a signal. In other embodiments, the sensors 14a may be capacitive or inductive proximity sensors that output a voltage reflective of the distance from the moveable element 12.

In the illustrated embodiment of FIG. 1, the direction 18 or axis 18 represents the direction through the moveable element 12. The direction 18 may be thought of as representing an axis extending through the centers of the faces of the sensors 14. Generally, the direction 18 may also be thought of as substantially the direction of a measurement of a distance (e.g. proximity) between a sensor and the surface of the material being sensed. However, the sensors 14 need not be axially aligned, since each can be oriented to be exactly perpendicular to the tapered face. A direction 19 represents a rotation about the axis 18 or direction 18.

Likewise, a direction 20 represents the principle motion of direction of the moveable element 12. The direction 20 is typically the direction of interest to be measured. Likewise, rotation about the direction 20 or the axis 20 is represented by the direction 21. Typically, measurement of the direction 20, or movement of the displaceable element 12 in the direction 20, is actually made by calculating. The calculation is based on the slope of the wedge shape of the moveable or displaceable element 12 and the distance from the element 12 to a sensor 14. The displacement in direction 20 is based on the linear relation between the detected "proximity" of the surface and the displacement of the displaceable element 12 in the direction 18.

The direction 22 represents the depth dimension of the system, and in particular, of the moveable or displaceable element 12. Likewise, rotation about the axis 22 is represented by the direction 23. With this system of axes 18, 20, 22 orthogonal to one another, combined with directions of rotation 19, 21, 23 about each the respective orthogonal axes 18, 20, 22, one may describe the system 10.

In the illustrated embodiment of FIG. 1, the moveable element 12 has a slope 26a on one side, and a slope 26b on the opposite side. The slope 26a, 26b may be equal and opposite. Alternatively, they may be different, or one even absent. That is, the two sides 30a, 30b of the element 12 are not parallel, but may not be symmetric. In fact, one of the slopes 26 may actually have a zero value. A benefit of having double sensors is that the system may still be made to work properly, even when one side 30 is not sloped.

By slope 24 is meant the rise 26 divided by the run 28 of the slope 24 of either side 30a, 30b, this being the conventional definition of slope in mathematical and engineering terms. Thus, the element 12 has a thickness 32 in the sensed (e.g. proximity) direction 18, which varies between one end 34a and the other end 34b of the object 12 being moved and sensed.

Figure 2:
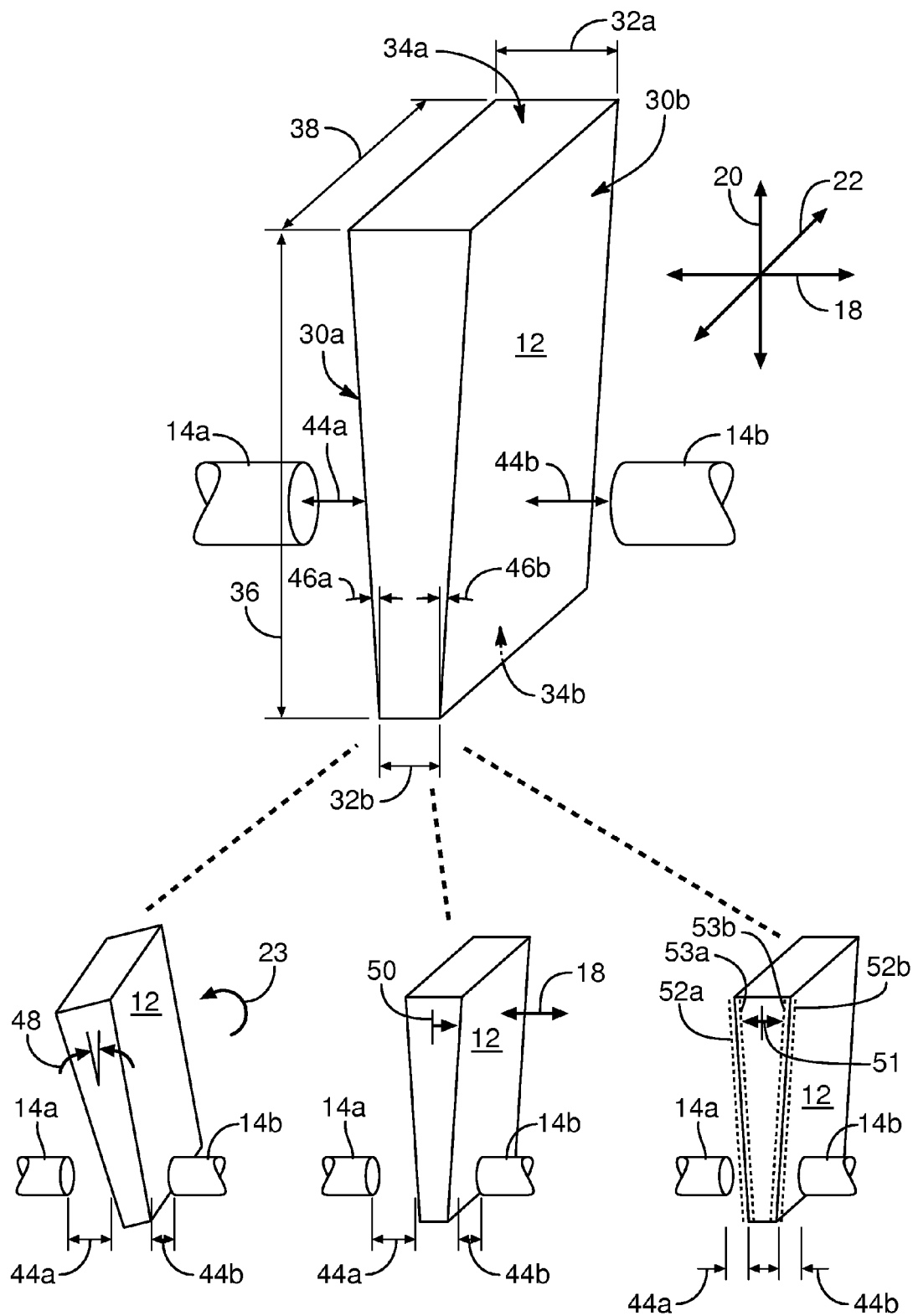
FIG. 2 is a perspective view of an apparatus in accordance with FIG. 1, illustrating various modes in which proximity distances may be incorrect, and the errors corrected by the use of double proximity sensors.

Referring to FIG. 2, an object 12 or moveable element 12, in one embodiment in accordance with the invention may include a dimension of height 36 in the direction 20 of the motion of interest. Meanwhile, the object 12 or moveable element 12 may have a depth 38 of some practical dimension. The depth 38 is measured in a direction 22 substantially orthogonal to both the direction of the motion of the object 12, and the direction of the distance between the sensors 14 and the object 12.

Significant in sensing and calculating displacement, a distance 32 or width 32 extends in the direction 18 between the sensors 14. A larger width 32a or thickness 32a at one end 34a stands opposed to a narrower thickness 32b at an opposite end 34b of the object 12. Thus, in the illustrated embodiment, each of the sides 30a, 30b of the object 12 is tapered or sloped at a respective angle 46a, 46b from the direction 20 of longitudinal motion of the moveable element 12 or object 12.

Each of the angles, 46a, 46b may be equal to the other, or not. In the illustrated embodiment, they are equal. Meanwhile, the angle 46 may also be described in terms of a rise 26 over a run 28 in accordance with the orthogonal axis system of directions 18, 20, 22. The sensors 14 are positioned opposite one another in facing the respective surfaces 34 sides 30 of the object 12. Depending on the angles 46 of the surfaces 30, and the distances 44a, 44b of the sensors 14a, 14b with respect thereto, the sensors 14 may face each directly, or may each be aimed to be exactly perpendicular to the respective surface 30 of interest thereto.

Meanwhile, the overall distance between the sensors 14a, 14b is a sum of the local thickness 32 of the object 12, plus each of the distances or proximities 44a, 44b of the respective sensors 14a, 14b. In the illustrated embodiment, the sensors 14 detect only a distance 44.

Due to the mechanical realities of manufacturing and assembly, limitations exist on precision of placement, orientation, and retention of all mechanical objects. Accordingly, various mechanical errors may exist upon assembly or installation of a system 10 in accordance with the invention. For example, the moveable element 12 or object 12 may be positioned at a slight displacement angle 48 with respect to a direction 20 That is, if a line were drawn between the center of the face of each of the sensors 14a, 14b, that line segment would extend in the direction 18. The nominal direction of principle motion of the movable element 12 is in the substantially orthogonal direction 20.

However, if the movable element 12 is canted or angled at some angle 48 with respect to the direction 20, then the effective slope 24a, 24b of each of the respective sides 30a, 30b will be altered. In the illustrated embodiment, the slope 24a associated with the side 30a has been increased, while the effective slope 24b associated with the side 30b has been decreased. Accordingly, the distances 44a, 44b corresponding thereto will change with displacement at a rate different from that expected.

Double sensors 14 straddle the moveable element 12, on opposite sides thereof. Therefore, the net effect of improper angular displacement 48 may be automatically accounted for. Addition of the signals corresponding to the distances 44a, 44b cancels such errors.

Likewise, a mechanical system may be installed or assembled with an improper or erroneous lateral displacement 50. That is, the moveable element 12 may be positioned such that the distances 44a, 44b are not equal. Thus, the proximity (distance 44a, 44b) of each respective sensor 14a, 14b with respect to the moveable element 12 will be erroneous. Nevertheless, just as the displacement angle 48 rotating the moveable element 12 in a direction 23 about the axis 22 changes the slope 24, the lateral displacement 50 changes the absolute distance 44, but not the slope 24. Thus, as the moveable element 12 moves in the direction 20 of displacement, a proper summing may be made with the signals reflecting the distances 44a, 44b of the sensors 14a, 14b. That compensation is straightforward by a simple mathematical combination of signals containing equal and opposite errors reflecting the positions (e.g. distances 44a, 44b) between sensors 14 and the moveable element 12. Thus real time, automatic compensation removes the effect of erroneous lateral displacement 50.

In general, a linear or any other known shape of the surfaces 30a, 30b can be accommodated. If the slopes 24 of the surfaces 30 are uniform, equal, and linear, then the correction of the displacement error 50 becomes mathematically very straightforward. However, more sophisticated curvatures could be handled, but may require more processing.

The lateral displacement 50 may occur to misalignment in installation, vibration during operation, or wobble. For example, in a circular moveable element 12, the moveable element 12 may be configured like a wedge wrapped in a circular shape, as one of the embodiments discussed below.

Due to the coefficient of thermal expansion, the material of the moveable element 12 may expand or contract in response to a change in temperature. Accordingly, each of the surfaces 30a, 30b may move toward or away from its respective sensor 14a, 14b. The dashed lines 52 (e.g. instances 52a, 52b) reflect expansion due to a relative increase in temperature and corresponding expansion of the moveable element 12. The dashed lines 53 indicate a shrinkage due to a reduction in temperature.

Such changes in dimension may be calibrated out. To the extent that such changes in dimension occur during operation, a temperature probe may accommodate them by reflecting the local temperature. The temperature of the object 12 is related by a coefficient of thermal expansion to the thickness 32. Accordingly, a very simple, typically linear, calculation can correct for the change in distance 44 that each sensor 14 detects between itself and the moveable element 12 in its thermally expanded or contracted condition.

Figure 3:
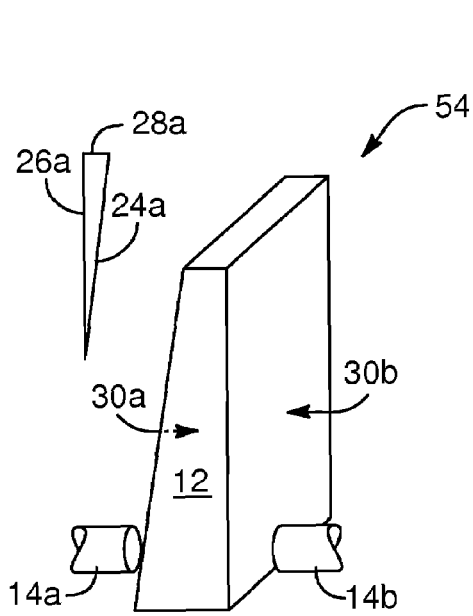
FIG. 3 is a perspective view illustrating an embodiment in which two proximity sensors are used, with only a single side of the displaceable element being tapered.

Referring to FIG. 3, the moveable element 12 need not be symmetrical. That is, the slope 24a of one side 30a need not be the same as the corresponding slope 24b of the opposite side 30b. The errors in angular displacement 48 and lateral displacement 50, as well as the expansion 52 or contraction 53 positions due to the thermal displacement 51 of material would still exist. Each would still be accommodated by the same processes described above, applied to the outputs of the sensors 14.

Figure 4:
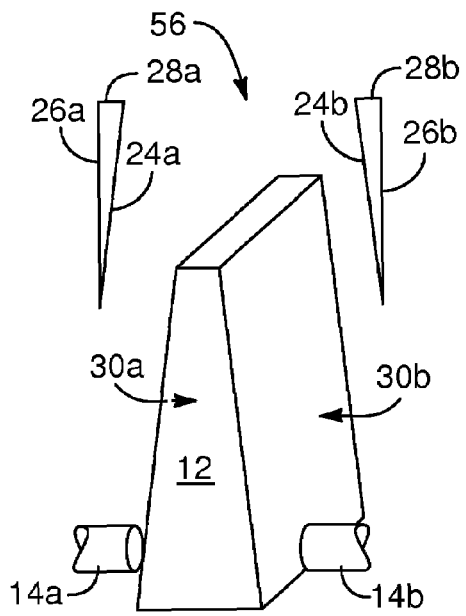
FIG. 4 is a perspective view of an alternative embodiment in which both sides of the displaceable element are tapered at the same angle.

Referring to FIG. 4, an Isosceles wedge provides a very simple case to handle. In this case, the distances 44a, 44b should be exactly equal at all times. Thus, any discrepancies as discussed with respect to FIG. 2 can be readily detected and processed out.

Figure 5:
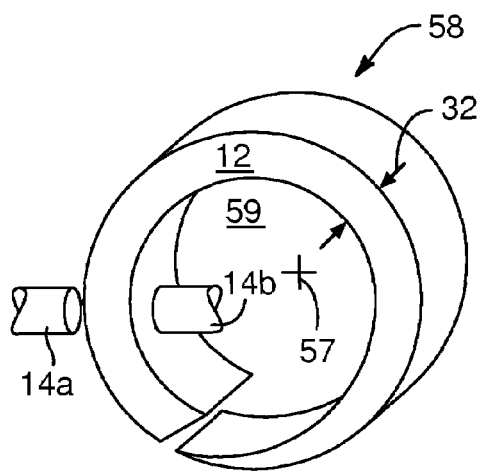
FIG. 5 is a perspective view of a displaceable element having a quasi-cylindrical wall, of a tapering thickness, moving between two proximity sensors that detect the taper by the proximity thereof to the sensors.

Referring to FIG. 5, a moveable element 12 may be configured such that the direction 20 is not straight, but curved, for example, along a circular path. Accordingly, the sensors 14 may be set inside and outside of that circular path to detect the change in thickness 32. Typically, the thickness 32 varies linearly with rotation (angular displacement) of the moveable element 12 about a center of rotation 57. The center of rotation 57 may be centered about an axis or axle, or may be implemented in a variety of other ways including a moveable flex-pivot or similar link or assembly, a race, a trolley, or the like providing a circular range of motion or the like. Typically, a quasi-cylindrical, tapered wedge 58 may be mounted on a disk 59 to form the movable element 12.

Figure 6:
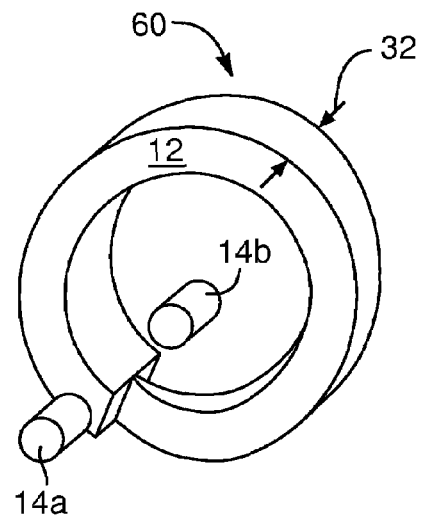
FIG. 6 illustrates a perspective view of an alternative embodiment in which a wedge is effectively cylindrically wrapped to accommodate rotational displacement, sensed by the proximity of the size of the wedge to a pair of sensors.

Referring to FIG. 6, a cylindrically wrapped wedge 60 may be formed of a disk 59. That is a disk 59 may be positioned, for example, in the axial center of the wrapped wedge 60. Here, the disk 59 is not shown in order to improve clarity. Spokes or the like could substitute about the circumference thereof.

In operation, the moveable element 12 may pivot or rotate within a range. The illustrated embodiment contemplates that range in motion of a full 360 degrees. Nevertheless, a segment of a circle may be sufficient. Likewise, support may come from any mechanism providing rotation about an axis of rotation 57. In the embodiment of FIG. 6, the disk 59 has not be shown opaque, for purposes of clarity. The disk 59 is effectively either transparent or absent so one can observe both sensors in their proper relation with respect to the thickness 32 of the movable element 12.

Figure 7:
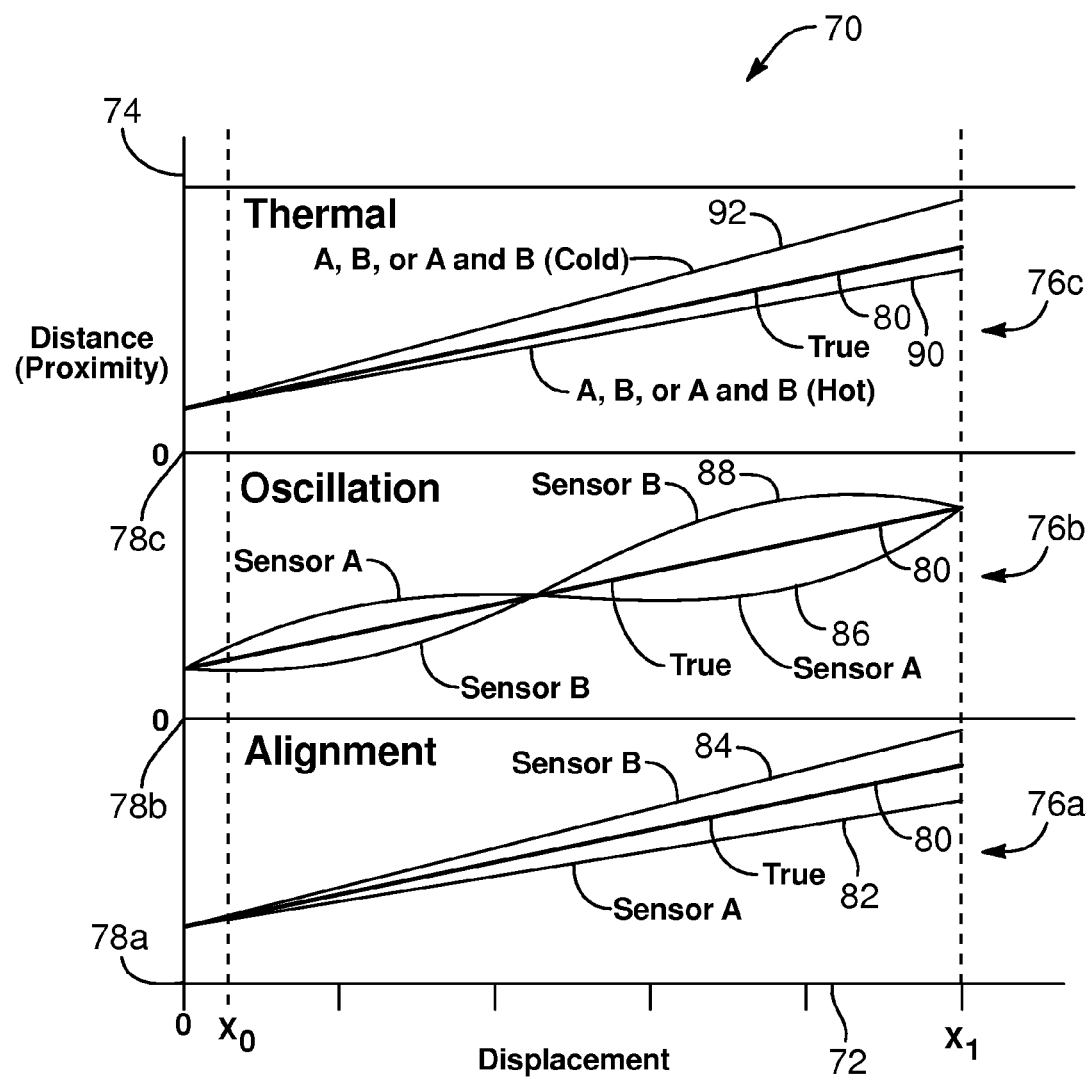
FIG. 7 is a graph illustrating schematically the effect of various sources of error on the observed distance of a displaceable element from proximity sensors as the displaceable element is moved transversely with respect to the sensors.

Referring to FIG. 7, a chart 70 provides an axis 72 representing displacement of a moveable element 12. Displacement is measured along an X-Axis direction corresponding to the direction 20 of the orthogonal coordinate system above. Nevertheless, a direction 20 may be wrapped in a cylindrical or circumferential direction as illustrated in the embodiments of the FIGS. 5 and 6.

As displacement 72 progresses, a distance or proximity axis 74 represents the distance 44 between each respective sensor 14 and the moveable element 12. FIG. 7 illustrates various types of effects due to the errors discussed above. For example, the distance axis 74 or proximity axis 74 represents a distance between a sensor 14 and a moveable element 12, within the reasonable errors occurring.

In the situation of FIG. 2, where alignment may be in error, the true distance 74 is represented by the curve 80. However, due to misalignment, one sensor 14 may read a closer distance 44 from the moveable element 12, reflecting a measured distance illustrated by the curve 82. However, the opposite sensor 14 would therefore read a distance 44 having an opposite error, as represented by the curve 84. Since misalignment results in an equal and opposite error on behalf of each sensor, the two erroneous distances 82, 84 may be processed to immediately give the true distance 80.

Many similar situations may occur, such as the wobble of a circular moveable element 12, such as that illustrated in FIG. 6, or vibration of a moveable element 12 such as those illustrated in FIGS. 2-6. These conditions may result in a sensor providing an output curve such as shown by the curve 86. However, since such an error is equal and opposite to that of the opposing sensor 14, then that opposing sensor 14 will provide an output such as that represented by the curve 88. Accordingly, in both time and space, the errors in sensors A and B in FIG. 7 may each be compensated by the error in the opposite sensor 14.

As a moveable element 12 heats or cools to a temperature different from that at which it is calibrated, the true distance 44 along the distance or proximity axis 74 is reflected by the curve 80. If the moveable element is comparatively colder, then the curve 92 reflects qualitatively the output of either sensor 14a, 14b or both under that colder condition. That is, the moveable element 12 may register a greater distance because the cold typically causes materials of the moveable element 12 to shrink. Thus, the distance 44 between a sensor 14 and its respective surface 30 of the moveable element 12 will increase.

Likewise, at some other temperature where the moveable element 12 is hotter than some nominal value existing at calibration, a curve like the curve 90 reflects the change in output of the sensors or their sum. This is because both may register a smaller distance to the moveable element 12. That is, the distances 44 between the sensors 14 and their respective surfaces 30 will be decreased due to the expansion of the dimensions of the moveable element 12. Again, by a calibration and placement of a probe effective to determine the thermal expansion, the outputs of the sensors may be processed to return the proper distance reflected by the curve 80.

Figure 8:
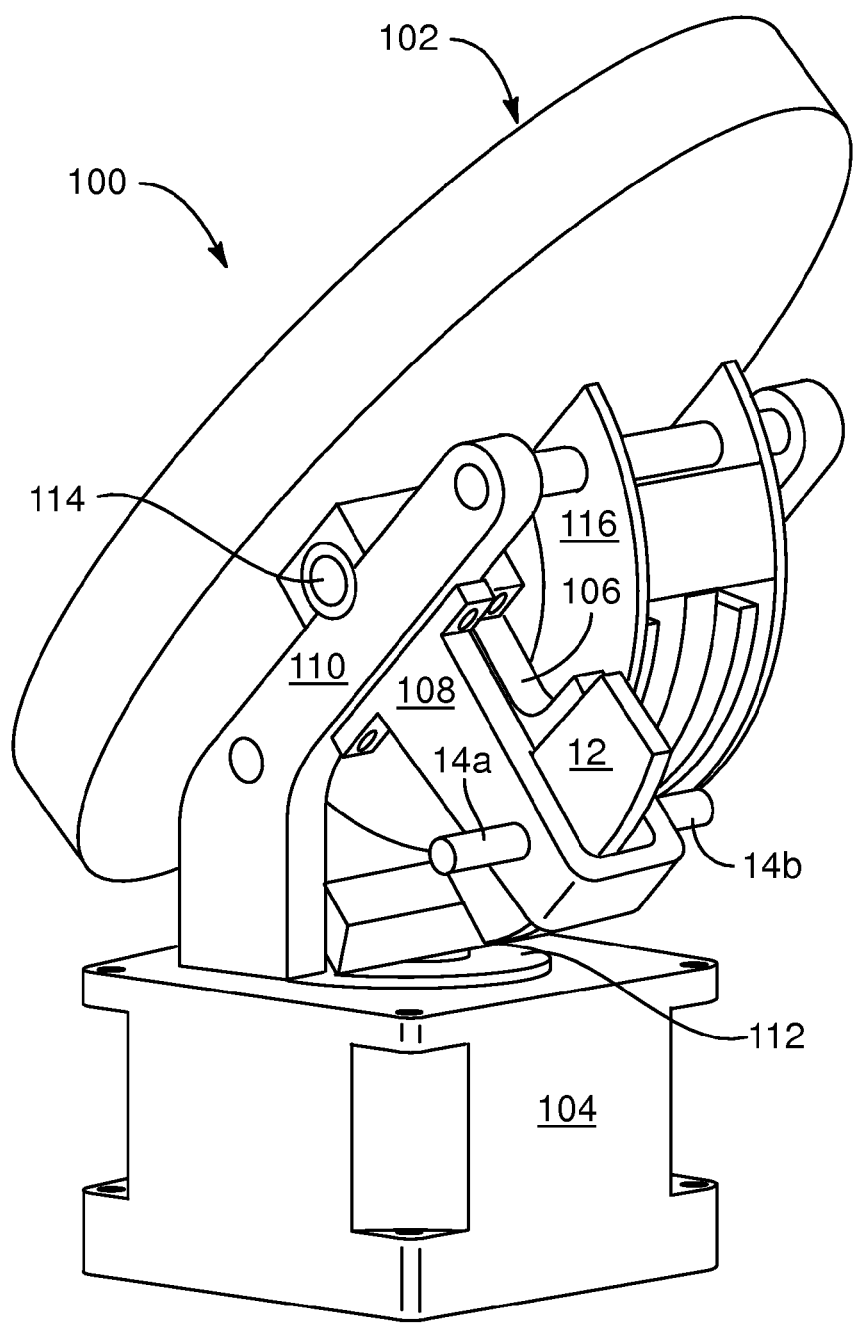
FIG. 8 is a perspective view of a system implementing the displaceable elements and proximity sensors to stabilize a fine steering mirror such as is used in satellite systems.

Referring to FIG. 8, an apparatus in accordance with the invention was implemented in a system 100 for stabilizing a fine steering mirror 102 or mirror 102. In the illustrated embodiment a base 104 served as a fixed platform or mount for the system 100. Meanwhile, a mount 106 connected the moveable element 12 rigidly to move with the mirror 102.

Likewise, the sensors 14a, 14b were secured to a mount 108 that did not move with the mirror 102. Rather, a yoke 110 fixed to a turntable 112 held a structural assembly 116. The mirror 102 was mounted on a flexible pivot member to rotate about a rotational axis 114. The axis 114 could have been an axle, but was not in this case, in order to provide certain other mechanical and thermal benefits.

Connected between the assembly 116 and the mirror 102 were a drive motor and the flexible pivot system, in order to rotate or pivot the mirror 102 with respect to the assembly 116, yoke 110, and turntable 12. Meanwhile, the yoke 110 and assembly 116 moved in fixed relation with respect to the turntable 12. In the illustrated embodiment, the moveable element 12 operated as a segment of a circular, wrapped wedge 12 such as that illustrated in FIG. 6.

The performance parameters of stabilizing the mirror 102 of the system 100 demonstrated low energy use, excellent isolation for thermal and mechanical losses, negligible friction, and a very high repeatability and precision.

Referring to FIG. 9, a table 120 illustrates the parameters 122 of interest for the system of FIG. 8 with their values 124. Of particular note is the elevation error mean and its corresponding elevation error standard deviation. The precision and repeatability were extraordinary having highly competitive costs. This was due largely to the use of proximity sensors to measure distance, directly and linearly related to the motion of the moveable element 12 in the principal direction 20.

The mass total is only for the mechanical parts and does not include the electronics, since the electronics were not fully integrated but at a prototype stage of development. The average power was determined from a simulation commanding both axes to perform continuous simultaneous slow scans followed by a rapid reset in each axis, similar to a sawtooth wave profile. The peak power was obtained by commanding both axes to do a large-angle step simultaneously.

The error mean and standard deviations were calculated using the statistics of the angular position data at the end of a 10-second step-and-hold operation for both large and small steps. This is not absolute mirror pointing accuracy, but rather the error between the commanded angle and the angle measured by an encoder for azimuth and the wedge sensor 14 for elevation. Absolute pointing accuracy, as measured with a theodolite, was about 0.03 degrees at room temperature without temperature compensation.

The azimuth error is largely due to the limited counts of the encoder, 288000 counts over 360 deg of rotation, which results in 4.5 arcsec/count. The encoder toggled by one count during steady-state, resulting in the error.

The elevation axis is extremely repeatable, as shown by the small mean error. However, the noise, represented by the error standard deviation, was larger than desired, attributed mainly to the 16-bit A/D computer card's peak-to-peak noise of over 15 counts, as per the card manufacturer's specification sheet. This equates to about 25 arcsec of peak-to-peak noise, when the 16 bit resolution is applied to the full 30-deg mechanical angle of the elevation axis. Some noise is also generated by the wedge sensor electronics box. A digital moving average filter was applied to the wedge sensor feedback, which helped considerably. The control algorithm also contained a derivative term in the forward loop, which tended to enhance the noise.

The closed-loop bandwidth for each axis, as measured using the control systems analyzer, was about 70 Hz at the −3 dB point. The gain margin of 6 dB was verified by doubling the control algorithm gains in each axis and performing a step response test to determine that the system remained stable, which it did.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A system to determine displacement of an object moving in a principal direction substantially within a plane, and having lateral and transverse directions orthogonal to the principal direction and each other, the system comprising:
   a wedge capable of reciprocating along the principal direction between a first and a second position, and comprising first and second surfaces spaced apart to form laterally opposite sides of at least a portion of the wedge, the opposite sides spaced apart a distance varying in a known manner along the principal direction;
   a mirror fixed to the wedge to move therewith;
   a mount system supporting and aiming the mirror with respect to a satellite;
   a first sensor spaced away from the first surface to detect a first distance reflecting a proximity therebetween in the lateral direction;
   a second sensor spaced away from the second surface to detect a second distance reflecting a proximity therebetween in the lateral direction; and
   a processing element determining movement of the wedge in the principal direction by adding values, reflecting the first and second distances, thereby cancelling the effect of a mechanical error in the lateral position of the wedge between the first and second sensors.

2. The system of claim 1, wherein the principal direction is selected from a longitudinal direction and a circumferential direction with respect to the wedge.

3. The system of claim 2, wherein at least one of the first and second surfaces has a linear slope with respect to the plane.

4. The system of claim 3, wherein the plane is a plane of symmetry between the first and second surfaces.

5. The system of claim 4, wherein the first and second surfaces are positioned nominally symmetrically in the lateral direction between the first and second sensors.

6. The system of claim 1, wherein the first and second positions define a range of motion substantially greater than each of the first and second distances, and the principal direction is selected to be one of linear and circumferential with respect to the wedge.

7. The system of claim 1, wherein at least one of the first and second surfaces has a linear slope with respect to the plane.

8. The system of claim 1, wherein the plane is a plane of symmetry between the first and second surfaces.

9. The system of claim 1 wherein the first and second surfaces are positioned substantially symmetrically in the lateral direction between the first and second sensors.

10. The system of claim 1, further comprising:
    temperature sensors detecting temperatures of the system;
    the processing element further configured to correct an error in a value reflecting at least one of the position of the wedge in the principal direction, the first distance, and the second distance, wherein the error corresponds to a change in temperature of at least one of the sensors, electronics, supporting hardware, and the wedge.

11. The system of claim 1, further comprising a transfer function element providing a transfer function to leverage a comparatively smaller measurement value, corresponding directly to at least one of the first and second distances, to a comparatively larger measurement value reflecting the position of the wedge.

12. The system of claim 1, further comprising a feedback control mechanism to control the position of the wedge in the principal direction based on the first and second distances.

13. The system of claim 1 wherein the mechanical error is selected from a misalignment, an angular displacement, and an oscillation.

14. An apparatus to control displacement of an object moving in a principal direction within a plane having a lateral direction orthogonal to the plane, the apparatus comprising:
    wedge positionable within the plane;
    the wedge further comprising surfaces spaced laterally away from a center thereof to form opposite sides thereof;
    a mirror fixed to the wedge to move therewith;
    a mount system supporting and aiming the mirror with respect to a satellite;
    first and second sensors spaced laterally from the first and second surfaces, respectively, at respective first and second distances to detect the first and second distances;
    a processor adding values reflecting the first and second distances to provide a correction cancelling the effect of a mechanical error in a lateral position of the object; and
    the processor providing an output reflecting the position of the wedge in the principal direction, based on the first and second distances and the correction.

15. The apparatus of claim 14, further comprising a driver controlled by the processor to control the position.

16. A method to correct for the effect of a mechanical error in a lateral direction with respect to an object having a principal motion in a principal direction orthogonal to the lateral direction, the method comprising:
    providing an object shaped as a wedge having first and second surfaces spaced laterally opposite one another with thickness varying in a known manner along the principal direction, the object moving between first and second positions in the principal direction substantially within a plane;
    providing a mirror fixed to the wedge-shaped object to move therewith;
    providing a mount system supporting and aiming the mirror with respect to a satellite;
    obtaining a first value reflecting a first distance between a first sensor and the first surface;
    obtaining a second value reflecting a second distance between a second sensor and the second surface; and
    adding the first and second values to cancel the effect of a mechanical error in lateral positioning of the object between the first and second sensors and to measure displacement of the object along the principal direction.

17. The method of claim 16, further comprising selecting the principal direction from a path along at least a portion of at least one of a circle, a circumference, and a line.

18. The method of claim 17, further comprising applying a transfer function to leverage the first and second distances to determine the position of the object in the principal direction.

* * * * *

UNITED STATES PATENT AND TRADEMARK OFFICE
Certificate

Patent No. 7,616,326 B2                                                                                 Patented: November 10, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Morgan Davidson, River Heights, UT (US); Steven R. Wassom, Smithfield, UT (US); and Greg Hopkins, Logan, UT (US).

Signed and Sealed this Ninth Day of September 2014.

TARIFUR CHOWDHURY
*Supervisory Patent Examiner*
Art Unit 2886
Technology Center 2800